United States Patent [19]

Cook

[11] Patent Number: 5,011,171
[45] Date of Patent: Apr. 30, 1991

[54] SELF-PROPELLED VEHICLE

[76] Inventor: Walter R. Cook, Rt. 3, Box 14, Port Lavaca, Tex. 77979

[21] Appl. No.: 512,168

[22] Filed: Apr. 20, 1990

[51] Int. Cl.$^5$ .............................................. B62K 1/00
[52] U.S. Cl. .................................... 280/221; D21/194
[58] Field of Search ........................ 280/221; D21/194

[56] References Cited

U.S. PATENT DOCUMENTS

| D. 216,817 | 3/1970 | Purdy | D21/194 |
|---|---|---|---|
| 3,107,926 | 10/1963 | Verge | 280/221 |
| 3,109,675 | 6/1965 | Tang | 280/221 |
| 3,190,675 | 6/1965 | Tang | 280/221 |
| 3,221,445 | 12/1965 | Riva | 280/221 |
| 3,304,098 | 2/1967 | Sloan et al. | 280/221 |
| 3,318,614 | 5/1967 | Lee | 280/221 |
| 3,506,283 | 4/1970 | Tang | 280/221 |
| 4,786,067 | 11/1988 | Tang | 280/221 |
| 4,786,068 | 11/1988 | Tang | 280/221 |
| 4,786,069 | 11/1988 | Tang | 280/221 |

FOREIGN PATENT DOCUMENTS

| 275591 | 3/1965 | Australia | 280/221 |
|---|---|---|---|
| 768034 | 9/1967 | Canada | |
| 1398045 | 3/1965 | France | 280/221 |
| 1059390 | 2/1967 | United Kingdom | 280/221 |

Primary Examiner—Mitchell J. Hill
Attorney, Agent, or Firm—Harrison & Egbert

[57] ABSTRACT

A self-propelled vehicle comprising a first wheel, a second wheel, and a third wheel of greater diameter than the first and second wheels. The third wheel has a center of rotation that is aligned with the first and second wheels. A first pedal connects the first wheel and the third wheel. A second wheel connects the second wheel and the third wheel. The first and second pedals are offset by 180 degrees relative to the third wheel. The third wheel has a width greater than the first and second wheels. The center of rotation of the third wheel is aligned with the centers of rotation of the first and second wheels. The pedal has a suitable width for the receipt of a human foot. The first and second pedals are detachably connected to the wheels. A suitable snap-ring is provided so as to allow each of the pedals to be received by each of the wheels of the present invention.

20 Claims, 3 Drawing Sheets

SELF-PROPELLED VEHICLE

TECHNICAL FIELD

The present invention relates to self-propelled vehicles. More particularly, the present invention relates to self-propelled vehicles, such as unicycles and the like, for use as amusement devices for children.

BACKGROUND ART

Throughout the years, there have been many devices that have been designed to amuse children. Various amusement items allow the child to transport himself or herself on a self-propelled vehicle. Amusement devices of this nature are quite common and are enjoyed by children everywhere. Roller skates, bicycles, scooters, tricycles, and the like, are well known devices for amusing children in this manner.

U.S. Pat. No. 3,107,926, issued on Oct. 22, 1963, to Carl B. Verge describes one type of self-propelled amusement device. This invention employs three wheels of equal size, width, and diameter. Pedals extend on each side of the central wheel and engage the outer wheels. Each of these pedals are removed from each other by 180 degrees. This device provides an amusement apparatus which is capable of being in rolling contact with a floor, a pavement, a sidewalk, or an equivalent surface. The user is supported by standing on the pedals and by manipulating portions of the device on which he is standing. As a result, self-propulsion is achieved in a desired direction. Specifically, the person stands on and is supported by the pedals. By shifting one's weight from one crank arm to the other, a balance is achieved. The balance is maintained by applying greater or lesser weight to one foot than the other. By applying weight first to one pedal and than to the other in the manner of applying force to the pedals of a bicycle, the user can effect self-propulsion along a supporting surface while supported by the device. According to the inventor, this device is capable of being learned within ten or fifteen minutes.

U.S. Pat. No. 4,786,067, issued on Nov. 22, 1988, to Chun-Yi Tang describes a unicycle construction. This unicycle includes two wheels having spacers extending between each of the wheels. Pedals are provided on the outer surfaces of these wheels. Each of these pedals is offset from the other pedal by 180 degrees. Although two wheels are provided on this unicycle, users can learn to unicycle by closing the distance between each of the wheels of the unicycle. As each of the wheels is positioned closer together, the effect of the device will more closely resemble that of a unicycle. The inventor Chun-Yi Tang has also disclosed similar concepts in U.S. Pat. Nos. 3,190,675, 3,506,283, 4,786,068, and 4,786,069.

Canadian Patent No. 768,034, issued on Sept. 26, 1967, to Charles W. Sloan et al., discloses a similar type of self-propelled amusement device. This invention describes a pair of spaced wheels interconnected by a one-piece crank mechanism which acts as a support for a person standing on the device. The wheels of this device are essentially hoop-like elements having no internal support. The ends of the crank mechanism are connected to the inner circumferential faces of the wheels. Surfaces are provided on the crank mechanism so as to receive the feet of the operator.

Each of these prior art arrangements is of relatively complicated construction. In order to enhance its suitability as a children's toy, it is important that the item be very inexpensive. In addition to being inexpensive, the device should be relatively easy to assemble so that children can assemble the item without the help of their parents. Additionally, it is believed that children will enjoy the "unicycle" effect much more than having three equal sized wheels rolling on the ground at the same time. It is believed that the longer the challenge for mastering a device, the longer that children, and other persons, will have an interest in using the device.

It is an object of the present invention to provide a self-propelled vehicle that is easy to assemble.

It is another object of the present invention to provide a self-propelled vehicle that is relatively inexpensive.

It is another object of the present invention to provide a self-propelled vehicle which creates a unicycle-like effect.

It is still another object of the present invention to provide a self-propelled vehicle that provides unicycle-like challenges but maintains the safety of the user.

These and other objects and advantages of the present invention will become apparent from a reading of the attached specification and appended claims.

SUMMARY OF THE INVENTION

The present invention is a self-propelled vehicle for use by children and other persons. The present invention comprises a first wheel, a second wheel, and a third wheel. In the preferred embodiment of the present invention, the third wheel will have a greater diameter than the first and second wheels. The first and second wheels are aligned in parallel on opposite sides of the third wheel. Additionally, the third wheel will have a greater width than either of the first and second wheels. The center of rotation of the third wheel is aligned with the centers of rotation of first and second wheels.

A first pedal connects the first wheel to the third wheel. A second pedal connects the second wheel to the third wheel. The first and second pedals are detachably connected to the wheels.

The first and second wheels have generally equal diameters. The diameters of these first and second wheels is slightly less (approximately one-half inch) than the central or third wheel.

The first and second pedals have a width suitable for the receipt of a human foot. The first pedal is offset from the second pedal by 180 degrees relative to the third wheel. These first and second pedals are rotatably connected to the third wheel and to the respective first and second wheels. Each of the pedals includes a body, a first cylindrical portion, and a second cylindrical portion. The cylindrical portions of the pedals engages holes formed within the wheels. Additionally, the first and second cylindrical portions of the pedal include a notch suitable for the receipt of a snap-ring. After the cylindrical portions are inserted through the holes in the wheels, a snap-ring is fitted into this notch so as to maintain the pedal in its proper position relative to the wheels.

The first, second and third wheels, along with the first and second pedals, are made of a molded plastic material.

The vehicle of the present invention is operated by applying downward force to each of the pedals. This will create a rolling action along a flat surface. After some momentum is achieved, the self-propelled vehicle of the present invention will eventually tend to a unicycle-like effect. After speed is achieved, the first and second (outer) pedals act as training wheels for the device. Additionally, these outer wheels can serve to allow suitable pivoting and turning.

DETAILED DESCRIPTION OF THE INVENTION

Figure 1:
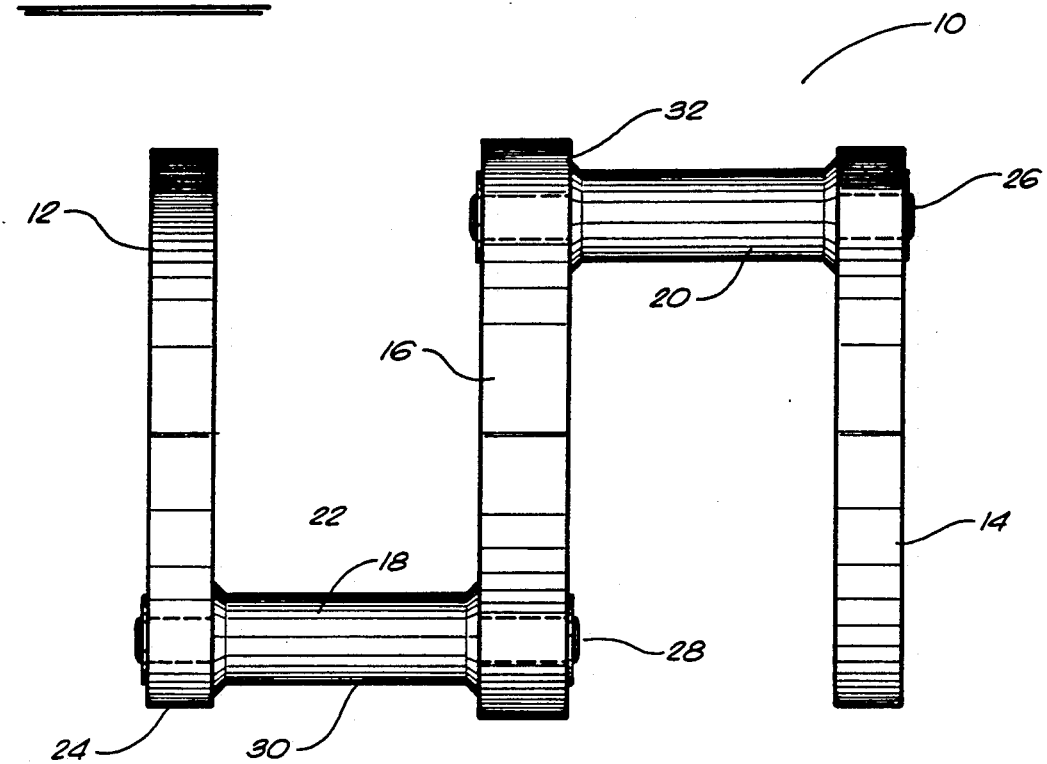
FIG. 1 shows a frontal view, of the self-propelled vehicle of the present invention.

Referring to FIG. 1 there is shown at 10, the self-propelled vehicle in accordance with the preferred embodiment of the present invention. Self-propelled vehicle 10 comprises first wheel 12, second wheel 14, and third wheel 16. A first pedal 18 extends between the first wheel 12 and the third wheel 16. A second pedal 20 extends between the second wheel 14 and the third wheel 16.

As can be seen in FIG. 1, the third wheel 16 of the self-propelled vehicle 10 has a greater diameter than the first wheel 12 or the second wheel 14. Additionally, the thickness of the third wheel 16 is greater than either the first wheel 12 or the second wheel 14. The greater diameter and the greater thickness of the third wheel 16 facilitate the use of the self-propelled vehicle of the present invention as a unicycle-type of apparatus.

Specifically, the first wheel 12 is, in the preferred embodiment of the present invention, approximately 13.5 inches in diameter. The first wheel 12 includes a hole 22 of approximately one inch (1") in diameter. The center of hole 22 is approximately one and one-half (1½") inches from the edge 24 of first wheel 12. Edge 24 of first wheel 12 has a surface suitable for rolling along a flat surface.

The second wheel 14 has a configuration which is the same as the first wheel 12. The second wheel 14 is positioned on the other side of the third wheel 16 from first wheel 12. Second wheel 14 also includes a hole 26 that is positioned in generally the same position as the hole 22 of the first wheel 12.

The third wheel 16 is the center wheel of the self-propelled vehicle 10 of the present invention. The third wheel 16, in its preferred embodiment, is approximately thirteen (13") inches in diameter. Wheel 16 includes a first one (1") inch hole and a second one (1") inch hole. These one (1") inch holes are approximately 180 degrees offset from each other relative to the third wheel 16. The holes in the third wheel 16 will align themselves with the holes 22 and 26 of the first wheel 12 and the second wheel 14. The third wheel 16 has a thickness of approximately two (2") inches. This is in contrast with the 1.5 inch thickness of the first wheel 12 and the 1.5 inch thickness of the second wheel 14.

Although the dimensions for the first wheel 12, the second wheel 14, and the third wheel 16 are mentioned herein, these dimensions are solely for the purpose of describing the preferred embodiment of the present invention. The specific dimensions should not be construed as a limitation on the scope of the present invention. It is believed that various other dimensions would be suitable for the purposes of the present invention. The dimensions specified herein are simply the dimensions known by the inventor as the best mode for accomplishing the purposes of the present invention at the time of the filing of this application. The first pedal 18 is received by the hole 22 in first wheel 12 and the hole 28 in the third wheel 16. Pedal 18 has a length suitable for receiving the width of a human foot. In other words, the user of the self-propelled vehicle 10 of the present invention should have the ability to place his foot on the surface 30 of pedal 18. Similarly, second pedal 20 is received by the hole 26 of second wheel 14 and the hole 32 of the third wheel 16. The second pedal 20 should have a length equivalent to that of the first pedal 18. The second pedal 20 is 180 degrees removed from the location of the first pedal 18.

Figure 2:
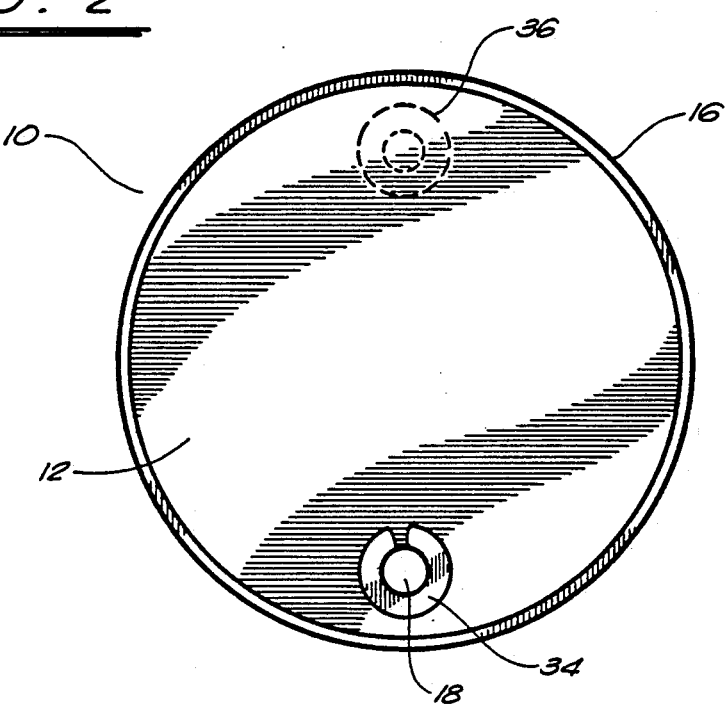
FIG. 2 shows a side view of the self-propelled vehicle of the present invention.

FIG. 2 illustrates a side view of the self-propelled vehicle 10 of the present invention. Specifically, it can be seen that the first wheel 12 has a smaller diameter than the third wheel 16. The first pedal 18 is received by the first wheel 12. As is illustrated in FIG. 2, a snap-ring 34 is fitted about the first pedal 18 so as to maintain the first pedal 18 in proper position on the first wheel 12. The dotted line 36 illustrates the position of the second pedal 20 in relation to the present device.

It can be seen in FIG. 2 that the self-propelled vehicle 10 of the present invention has a circular configuration. The circular configuration of vehicle 10 allows the vehicle to traverse a flat surface in a continuous manner. The necessary pumping action is supplied by a human so as to allow the device to roll along such a flat surface. The first wheel 12 (and the second wheel 14) are of smaller diameter than the third wheel 16. As such, the first wheel 12 and the second wheel 14 will act as "training wheels" for the unicycle-type operation of the third wheel 16. Also, the smaller diameters of the first wheel 12 and the second wheel 14 allow for turning and cornering. In devices having wheels of the same diameter, it becomes extremely difficult to turn or corner.

The pedals 18 and 20 of the present invention, in the preferred embodiment, have a specialized configuration. The configuration of pedals 18 and 20 accentuate the ability of the present invention to operate. Additionally, the configuration of pedals 18 and 20 allow for the ease of assembly, construction, manufacture, and disassembly. The configuration of pedals 18 and 20 are illustrated at 40 in FIG. 3.

Figure 3:
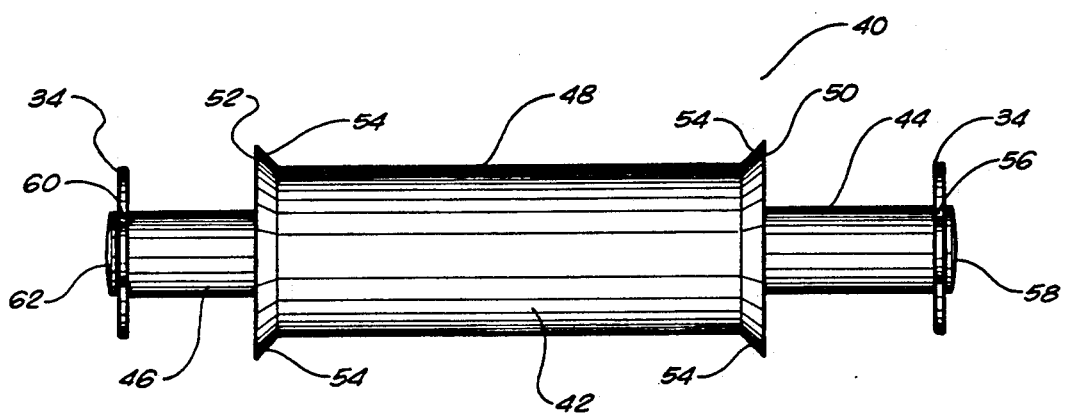
FIG. 3 shows an isolated view of a single pedal in accordance with the preferred embodiment of the present invention.

In FIG. 3, pedal 40 includes a body portion 42, a first cylindrical portion 44 and a second cylindrical portion 46. Body portion 42 may be either round or have a flat surface 48 for the purpose of supporting the foot. With either a flat or a round construction, body portion 42 has suitable shoulders 50 and 52 at its ends. Additionally, the body 42 flairs at 54 adjacent to shoulders 50 and 52. Shoulders 50 and 52 serve to stabilize and support the pedal relative to the wheels.

The first cylindrical portion 44 extends outwardly from shoulder 52 of body 42. Since, ideally, the pedal 40 is molded of plastic, the first cylindrical portion 44 will be integral with the body portion 42. This cylindrical portion 44 has a length of approximately 2.25 inches. The diameter of the first cylindrical portion 44 is 0.995 inches in diameter. This first cylindrical portion 44 will be received by the one (1") inch diameter hole of the third wheel 16 of the present invention. A notch 56 is formed adjacent to the end 58 of the first cylindrical portion 44. Notch 56 extends outwardly beyond the hole of the third wheel 16 so as to be in position for receiving a suitable snap-ring 34.

The second cylindrical portion 46 similarly extends outwardly from the shoulder 52 of body portion 42. Since the pedal 40 is manufactured of plastic, the second cylindrical portion 46 will be integral with body 42. Second cylindrical portion 46 has a length of approximately 1.75 inches. As with the first cylindrical portion 44, the second cylindrical portion 46 has at a diameter of 0.995 inches. The second cylindrical portion 46 is received by the hole in the first pedal 12 of the self-propelled vehicle 10 of the present invention. A notch 60 is formed adjacent to the end 62 of the second cylindrical portion 46. As with the first cylindrical portion 44, notch 60 is suitable for receiving the snap-ring 34.

Figure 4:
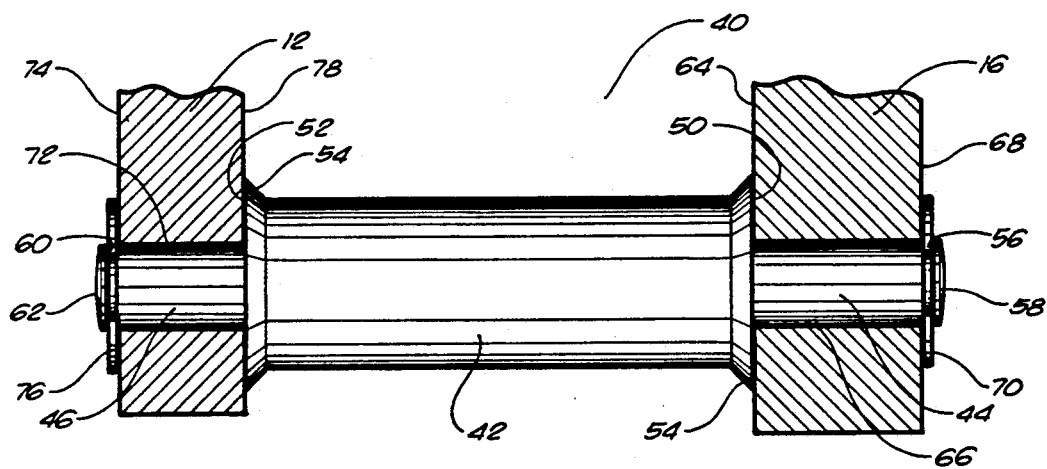
FIG. 4 shows the pedal of FIG. 3 as attached to the wheels of the present invention.

With reference to FIG. 4, the pedal 40 is illustrated as received by the first wheel 12 and the third wheel 16. It can be seen that the body 42 flairs outwardly at 54 in a "bevelled" manner. Shoulder 50 of body 42 is generally juxtaposed against the inner surface 64 of third wheel 16. Shoulder 50 serves to stabilize and support the pedal 40 during the use of the self-propelled vehicle 10. The first cylindrical portion 44 extends through hole 66 of the third wheel 16. The end 58 of the first cylindrical portion 44 extends outwardly from the other side 68 of the third wheel 16. The snap-ring 70 is fastened to the notch 56 of the first cylindrical portion 44. Snap-ring 70 is juxtaposed against surface 68 of the third wheel 16. In this manner, the first cylindrical portion 44 of pedal 40 is maintained in its position relative to the third wheel 16.

In a similar manner, the second cylindrical portion 46 extends through the opening 72 of the first wheel 12. The end 62 extends outwardly from the side 74 of the first wheel 12. Snap-ring 76 is fixed about the notch 60 of the second cylindrical member 46. The shoulder 52 of body 42 of pedal 40 is in juxtaposition with the inner surface 78 of first wheel 12. In this manner, the second cylindrical portion 46 and the pedal 40 are supported in proper position relative to the first wheel.

The configuration illustrated in FIG. 4 is similar to the configuration of the pedal 40 as between the second wheel 14 and the third wheel 16.

Figure 5:
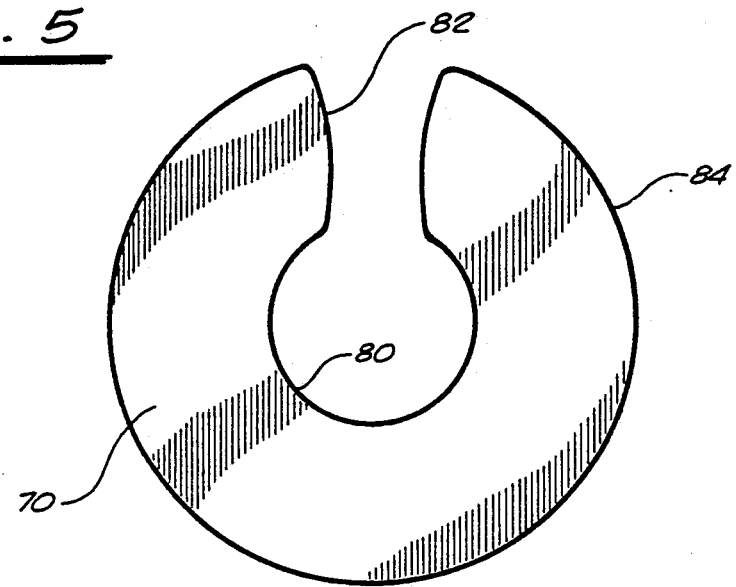
FIG. 5 is an isolated close up view, in side elevation, of the snap-ring of the present invention.

FIG. 5 illustrates the snap-ring 70 of the present invention. Essentially, snap-ring 70 is made of a rigid material and is approximately one-eighth of an inch (⅛") thick. Snap-ring 70 includes the central opening 80 which extends around the notched areas 56 or 60 of the cylindrical portions of the pedal 40. The slot 82 formed in the snap-ring 70 allows for the expansion of the central area 80 as needed to fit around the cylindrical portions of the pedal 40. After the cylindrical portions 44 and 46 are inserted into their respective wheels, snap-ring 70 is fitted around the notched area so as to maintain the pedal 40 in its proper position relative to the wheel. The grooves that accommodate the snap-rings are close to the edge of the wheels so as to stop the wobbling of the wheels and to make a tighter configuration. It should be noted that the snap-rings will not only hold the device together, but also has a stability effect because of their tight placement against the wheels. Since this is a plastic against plastic relationship, no oil, or other lubrication, is required for the device of the present invention. The snap-ring 70 of the present invention in its preferred mode, has a ¾ inch center hole. The outer surface 84 should cover a two (2") inch surface area when put in position.

Figure 6:
FIG. 6 is an illustration of the usage of the self-propelled vehicle of the present invention.

FIG. 6 illustrates the use of the self-propelled vehicle 10 of the present invention. As can be seen in FIG. 6, child 90 has her feet on the pedals between each of the wheels of the vehicle 10. When the child 90 initially stands on the pedals of the vehicle 10, the vehicle will tilt to one side or the other. This tilt is caused by the difference in size between the outer wheels and the center wheel. The child can then shift her weight from foot to foot on the pedals so as to create a forward or backward motion. As the vehicle 10 travels forward, a "balancing effect" is achieved. This is similar in nature to the balancing effect created by riding a bicycle. When forward motion is established, it is certainly easier to maintain the balance on the center wheel 16. This balance is further improved because of the greater thickness of the center wheel 16. When the child 90 masters the abilitY to travel on the vehicle 10, virtually all of the forward motion will occur because of the forward motion of the single wheel 16. There should be little or no reliance upon the outer wheels 12 and 14 during forward motion. However, when it is necessary to turn a corner or to otherwise balance oneself, the importance of the outer wheels 12 and 14 come into play. By shifting the weight to one outer wheel or the other, an appropriate left or right turn can be made in a simple, safe, and easy manner. Also, if the child 90 should lose her balance while using the vehicle 10, the outer wheels 12 and 14 will act as "training wheels" so as to keep the child from falling or the apparatus 10 from tipping over.

It should be noted that the preferred embodiment of the present invention has been described hereinbefore. This embodiment of the present invention offers significant manufacturing and packaging advantages. Since the present invention can be manufactured from just five separate parts, the present invention offers a relatively simple assembly procedure. Since the device can be easily separated or pulled apart, it is easy to assemble and disassemble the device as needed Since all of the pieces will lay rather flat in a package, the device can easily be packaged, shipped, and stored. Furthermore, the simplicity of assembly is very important. The present invention is designed to be a children's toy. Therefore, ease of assembly is an important consideration.

Various other embodiments can be envisioned by the present invention. For example, all of the components could be molded together in a single structure. Although it is preferable that rotation be achieved between each of the pedals and the wheels, it may be possible to build the present invention with the pedals and wheels fixedly attached together. Additionally, various ways of affixing the pedals to the wheels could be utilized, in place of the snap-ring configuration. As stated previously, the dimensions are given for the purposes of the preferred embodiment. This, however, should not be construed as a limitation on the present invention. Larger children or adults may prefer to have larger wheels so that greater speeds and greater maneuverability can be achieved.

The embodiment as illustrated and discussed in the specification is only intended to teach those skilled in the art the best way known by the inventor to make and use the invention. Nothing in the specification should be considered as limiting the scope of the present invention. Many changes could be made by those skilled in the art to produce equivalent systems without departing from the invention. The present invention should only be limited by the following claims and their legal equivalents.

I claim:

1. A self-propelled vehicle comprising:
a first wheel;
a second wheel; and
a third wheel of greater diameter than said first and second wheels, said third wheel having a center of rotation aligned with said first and second wheels, said third wheel connected to said first wheel by a first pedal, said third wheel connected to said second wheel by a second pedal, said first and second wheels located on opposite sides of said third wheel.

2. The vehicle of claim 1, said first and second wheels being of equal diameters.

3. The vehicle of claim 1, said first pedal extending between said first wheel and said third wheel, said second pedal extending between said third wheel and said second wheel.

4. The vehicle of claim 1, each of said first and second pedals having a width suitable for the receipt of a human foot.

5. The vehicle of claim 1, said second pedal being offset from said first pedal by 180 degrees relative to said third wheel.

6. The vehicle of claim 1, said first and second pedals being rotatably connected to said third wheel.

7. The vehicle of claim 6, each of said first and second pedals having an outwardly extending cylindrical portion for engaging a hole extending through a width of said third wheel, said cylindrical portion rotatable within said hole of said third wheel.

8. The vehicle of claim 7, each of said first and second pedals further including a snap-ring fitting onto a notched portion of said cylindrical portion, said snap-ring engaging said cylindrical portion and juxtaposed against the side of said third wheel.

9. The vehicle of claim 6, said first and second pedals being rotatably connected to said first and second wheels, respectively.

10. The vehicle of claim 9, each of said first and second pedals having an outwardly extending cylindrical portion for engaging holes in said first and second wheels.

11. The vehicle of claim 10, each of said cylindrical portions of said first and second pedals including means for retaining said first and second pedals in said hole of said first and second wheels, respectively.

12. The vehicle of claim 4, each of said first and second pedals having a flat upper surface.

13. The vehicle of claim 1, said third wheel having a width greater than each of said first and second pedals.

14. The vehicle of claim 1, said first, second and third wheels and said first and second pedals being of molded plastic.

15. The vehicle of claim 1, each of said first and second pedals comprising:
a body portion;
a first cylindrical portion integrally formed with said body portion and extending outwardly therefrom; and
a second cylindrical portion extending outwardly and integrally formed with said body portion, said second cylindrical portion extending outwardly from the end of said body portion opposite said first cylindrical portion.

16. The vehicle of claim 15, said first cylindrical portion having a circumferential notch adjacent the end of said first cylindrical portion, and said second cylindrical portion including a circumferential notch adjacent the end of said second cylindrical portion opposite said first cylindrical portion.

17. The vehicle of claim 16, said circumferential notch of said first cylindrical portion and said circumferential notch of said second cylindrical portion receiving a snap-ring releasably fitted to and received by said circumferential notches.

18. The vehicle of claim 15, said body portion having a flaired shoulder adjacent the surface of said third wheel.

19. A self-propelled vehicle comprising:
a first wheel;
a second wheel;
a third wheel of greater diameter than said first and second wheels and of a greater width than said first wheel;
a first pedal extending between said first wheel and said third wheel; and
a second pedal extending between said second wheel and said third wheel, said first pedal being offset from said second pedal by 180 degrees relative to said third wheel.

20. The vehicle of claim 19, said first pedal being releasably connected to said first wheel and said third wheel, said second pedal being releasably connected to said second wheel and said third wheel.

* * * * *